Sept. 11, 1934.  M. ROSENKRANZ  1,973,674
PIPE TESTING MACHINE
Filed April 9, 1932  3 Sheets-Sheet 1
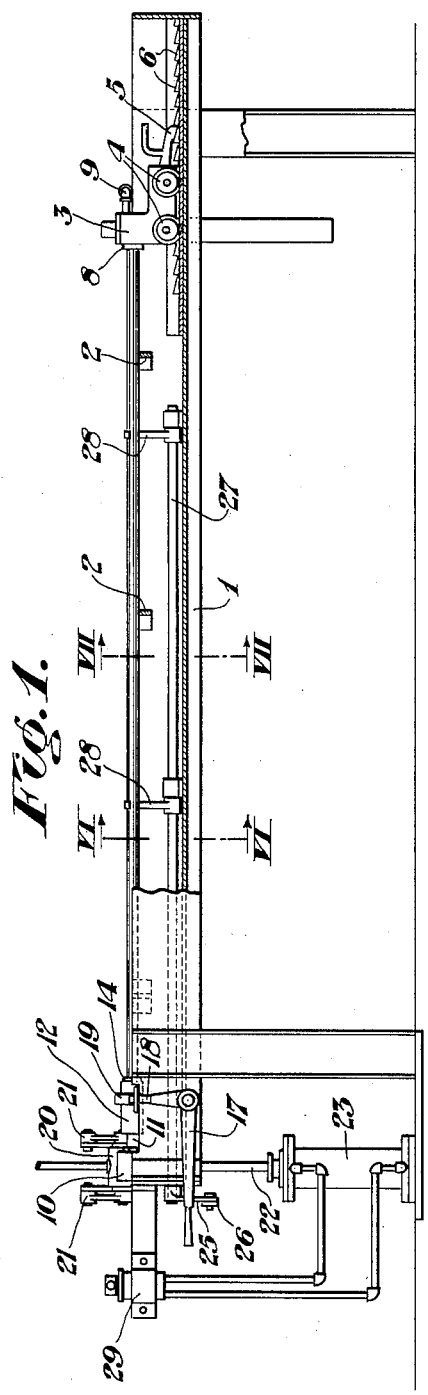
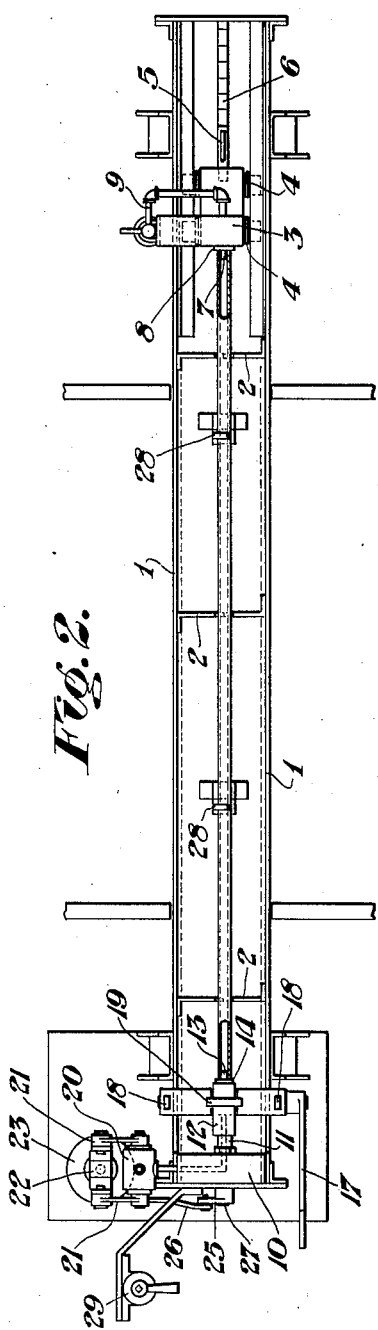
Inventor:
MAX ROSENKRANZ,
by Usina & Rauber
his Attorneys.

Sept. 11, 1934.   M. ROSENKRANZ   1,973,674
PIPE TESTING MACHINE
Filed April 9, 1932   3 Sheets-Sheet 2
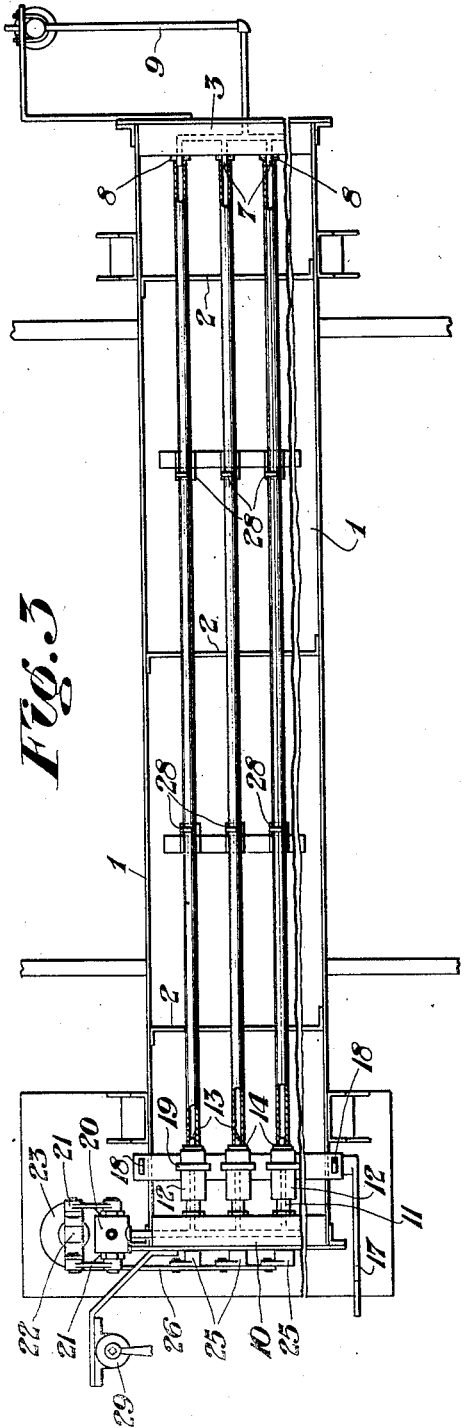
Inventor:
MAX ROSENKRANZ,
by: Usina & Raubu
his Attorneys.

Sept. 11, 1934.  M. ROSENKRANZ  1,973,674
PIPE TESTING MACHINE
Filed April 9, 1932  3 Sheets-Sheet 3
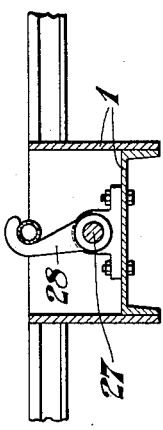
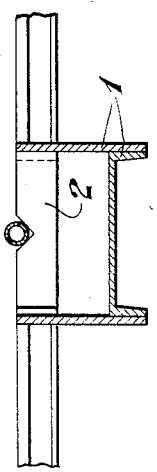
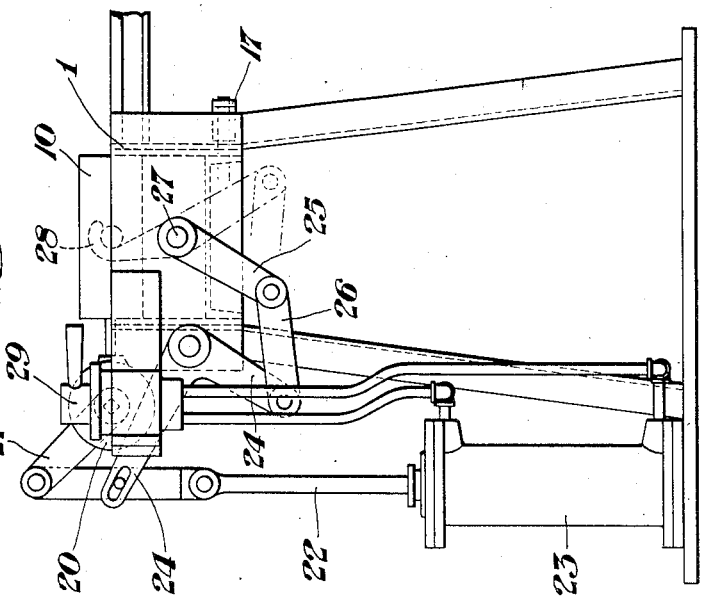
Inventor:
MAX ROSENKRANZ,
by
his Attorneys Patented Sept. 11, 1934

1,973,674

UNITED STATES PATENT OFFICE 1,973,674

PIPE TESTING MACHINE

Max Rosenkranz, Bethel Township, Allegheny County, Pa., assignor to National Tube Company, a corporation of New Jersey Application April 9, 1932, Serial No. 604,297

3 Claims. (Cl. 73—51)

This invention relates to machines for testing pipes by fluid pressure, one of the objects being to construct a machine of this character which may be operated very rapidly.

Having reference to the accompanying drawings, which illustrate a specific form of this new machine:

Figure 1 is a side elevation.

Figure 2 is a top plan.

Figure 3 is a top plan of a modification.

Figure 4 is a vertical cross-section of a detail from the first two figures.

Figure 5 is an end view.

Figure 6 is a cross-section from the line VI—VI in Figure 1.

Figure 7 is a cross-section from the line VII—VII in Figure 1.

This machine consists of an elongated frame 1 which has several notched cross members 2 for receiving the pipe to be tested. Its right hand end carries a head 3 which may be moved on wheels 4 and fixed in place by a dog 5 which engages a fixed ratchet section 6. This head 3 has a small projecting pipe 7 in its end facing the end of the pipe being tested, and leather washers 8 encircle this pipe. When the pipe under test is pressed against these washers a seal is established, the testing fluid passing from the pipe into the small pipe 7 through the head 3 and out a conduit 9.

The left hand end of the frame 1 carries a head manifold 10 to which a stationary plunger 11 is fixed. A cylinder 12 fits on the plunger 11 and has a nozzle 13 surrounded by leather washers 14 on its end so as to register with the end of the pipe being tested. The plunger 11 has a bore forming a conduit communicating with the manifold head 10 and with the inside of the cylinder 12. A baffle 15 is arranged inside the cylinder 12 so as to be struck by the fluid coming from the bore in the plunger 11. This plunger is supplied with packing 16 which forms a seal between it and the cylinder.

This cylinder 12 may be manually moved by a lever 17 which has an end 18 fitting both sides of a flange 19 thereon. The diameter of the plunger and the internal diameter of this cylinder are somewhat larger than the internal diameter of the pipe being tested.

When fluid under testing pressure is introduced into the cylinder 12 it will strike the baffle 15 and urge the washers 14 against the end of the pipe being tested. The fluid will then enter the pipe through the nozzle 13 and build up a pressure therein but, as the inside diameters of this pipe and of the head 12 are different, different total pressures will result which will hold the cylinder and the washers tightly against the pipe's end.

The testing fluid is introduced from a suitable source to the manifold head 10 through a valve 20 which is operated through levers 21 and a connecting-rod 22 by an air cylinder 23. The connecting-rod 22 is pivoted to rock a bell-crank 24 connected to a lever 25 through a link 26 which is connected to turn a shaft 27 which runs along within the frame 1. This shaft 27 carries a number of hooks 28 along its length which are constructed to engage and hold the pipe being tested on the cross-bars 2 when swung over it. These various connections are made so that the air cylinder 23 simultaneously opens the valve 20 and rocks the hooks 28 over the pipe. This air cylinder is controlled by a conveniently located valve 29 of the four-way type, that is, when this valve is thrown in one direction air will be admitted from the top of the cylinder and released from its bottom, while the opposite occurs when the valve is thrown in the other direction.

The drawings illustrate the machine just described for testing single pipes and also one for testing a plurality of pipes. This latter is exactly similar to the first except that the head 3 on the right hand end of the machine is fixed instead of being movable because the machine in this form is primarily intended for use with pipes which are all substantially the same length.

In using either machine the pipes are placed on the cross-bars 2 and the movable head 12 shoved against their ends by the hand-lever 17. The valve 29 is then operated so that the pipes are held down along their length by the hooks 28 to prevent their buckling under the stress of the testing pressure and the valve 20 is simultaneously opened so that the testing fluid is admitted to the pipe. This fluid first passes through the movable head 12 and causes it to tightly compress the pipe between it and the head 3 at the other end of the frame, because of the differential pressures existing within the head 12 and the pipe on test caused by the different sizes of each.

Preferably the pipe 9 of the head 3 communicates with a suitable scale chamber and with a bleeder valve in the conventional manner. After the pipe has been maintained under the testing pressure for the required time the valve 29 is thrown in the opposite direction so that the actions just described are reversed.

Although a specific form of this machine has been shown and described in accordance with the patent statutes, it is not intended to limit the scope of the invention exactly thereto, except as defined by the following claims.

I claim:

1. A machine for testing pipes by water pressure including a rack for holding the pipe under test, a manifold at one end of said rack, a bored plunger projecting from said manifold and opening thereinto, a cylinder fitted on said plunger, a nozzle and seal arranged on said cylinder to register with one end of said pipe, a conduit leading to said head, a valve for said conduit, a shaft extending under said rack, hooks spaced along said shaft and constructed to engage and hold said pipe down when swung thereover, means including a reciprocating motor and levers arranged to connect said valve and said shaft to said motor so that the valve opens and the shaft turns to pipe engaging position together.

2. A machine for testing pipes by water pressure including a rack for holding the pipe under test, a manifold at one end of said rack, a conduit opening into said manifold, a bored plunger projecting from said manifold with its bore communicating therewith, a cylinder fitted on said plunger, said cylinder and plunger being arranged so that the former slides toward said pipe, means for sliding said cylinder on said plunger, a nozzle and a seal arranged on said cylinder to register with one end of said pipe, a baffle fixed in said cylinder to oppose the bore in said plunger, a valve for said conduit, a shaft extending under said rack, hooks spaced along said shaft and constructed to engage and hold said pipe down when swung thereover, and means including a reciprocating motor and levers, the latter being constructed and arranged to connect said valve and said shaft to said motor so that the valve opens and the shaft turns said hooks to pipe engaging position together, upon operation of the former.

3. A machine for testing pipes by fluid pressure including a rack for holding the pipe under test, a longitudinally bored plunger fixed adjacent one end of said pipe and alined therewith, a cylinder fitting over said plunger for sliding movement toward said end and with its end provided with a seal and a nozzle means communicating with its interior, a baffle fixed in said cylinder across the opening to said nozzle means to oppose the bore in said plunger, and means for conducting fluid under pressure to the bore in said plunger.

MAX ROSENKRANZ.